United States Patent
Bordenyuk

(10) Patent No.: US 9,535,273 B2
(45) Date of Patent: Jan. 3, 2017

(54) APPARATUS FOR VIEWING THROUGH OPTICAL THIN FILM COLOR FILTERS AND THEIR OVERLAPS

(75) Inventor: Andrey Bordenyuk, San Jose, CA (US)

(73) Assignee: PHOTON DYNAMICS, INC., San Jose, CA (US)

( * ) Notice: Subject to any disclaimer, the term of this patent is extended or adjusted under 35 U.S.C. 154(b) by 297 days.

(21) Appl. No.: 13/188,210

(22) Filed: Jul. 21, 2011

(65) Prior Publication Data

US 2013/0021466 A1    Jan. 24, 2013

(51) Int. Cl.
  *H04N 7/18*  (2006.01)
  *G02F 1/13*  (2006.01)
  *G02B 6/42*  (2006.01)

(52) U.S. Cl.
  CPC .......... *G02F 1/1309* (2013.01); *G02B 6/4249* (2013.01); *G02B 6/4269* (2013.01)

(58) Field of Classification Search
  CPC .............................. H04N 7/18; G02F 1/1309
  USPC ............................................ 348/93; 362/555
  See application file for complete search history.

(56) References Cited

U.S. PATENT DOCUMENTS

| | | | | |
|---|---|---|---|---|
| 4,680,579 A | * | 7/1987 | Ott .......................... | G02B 26/06 348/755 |
| 4,893,353 A | * | 1/1990 | Iwaoka ..................... | G02F 1/11 398/183 |
| 5,012,314 A | * | 4/1991 | Tobita ................... | G02F 1/1309 250/205 |
| 5,195,102 A | * | 3/1993 | McLean ............... | H01S 5/02216 372/34 |
| 5,506,676 A | * | 4/1996 | Hendler et al. ............ | 356/237.1 |
| 5,615,039 A | * | 3/1997 | Henley .......................... | 359/257 |
| 5,764,677 A | * | 6/1998 | Scheps .............. | H01S 3/094034 372/20 |
| 6,249,381 B1 | * | 6/2001 | Suganuma ........... | G02B 27/123 359/618 |
| 6,282,309 B1 | * | 8/2001 | Emery ......................... | 382/145 |

(Continued)

FOREIGN PATENT DOCUMENTS

WO    WO 2007/083437    7/2007

*Primary Examiner* — Jay Patel
*Assistant Examiner* — Irfan Habib
(74) *Attorney, Agent, or Firm* — TransPacific Law Group; Pavel I. Pogodin, Esq.

(57) ABSTRACT

An optical apparatus for creating an image of object features buried underneath color filters. The apparatus includes: an illumination light source producing an illuminating light, the illumination light source incorporating at least three laser light emitters operating at different wavelengths, the illuminating light being a combination of light signals produced by the at least three light emitters; an electronic control module coupled to each of the at least three laser light emitters and configured to drive each of the at least three laser light emitters using a pulsed driving signal with controllable amplitude and temporal pulse parameters; an illumination optical path delivering the illuminating light from the illumination light source to the object; an image sensor for creating the image of the object using light collected from the object; and an imaging optical path for delivering the light from the object to the image sensor. The three laser light emitters are operated in a saturation mode to reduce the illumination light coherence and eliminate the resulting speckle.

23 Claims, 4 Drawing Sheets

(56) References Cited

U.S. PATENT DOCUMENTS

| | | | |
|---|---|---|---|
| 6,370,175 B1* | 4/2002 | Ikeda | H04N 1/4015 347/236 |
| 6,449,006 B1* | 9/2002 | Shipp | 348/70 |
| 6,590,624 B1* | 7/2003 | Lee | 349/54 |
| 6,807,211 B1* | 10/2004 | Cok et al. | 372/39 |
| 7,984,557 B1* | 7/2011 | Carl | 33/263 |
| 8,066,385 B2* | 11/2011 | Kobori | H04N 9/3129 348/743 |
| 8,072,559 B2* | 12/2011 | Ikeda | G02F 1/1309 349/192 |
| 8,073,022 B2* | 12/2011 | Furuya | H01S 3/0675 372/21 |
| 8,314,919 B2* | 11/2012 | Ikeda | C03C 23/0025 349/192 |
| 8,390,926 B2* | 3/2013 | Bordenyuk | G01J 1/0214 359/385 |
| 8,462,311 B2* | 6/2013 | Yin | H01J 9/50 349/107 |
| 9,146,409 B2* | 9/2015 | Wen | G02F 1/1309 |
| 9,304,090 B2* | 4/2016 | Cordingley | G02F 1/1309 |
| 2002/0190666 A1* | 12/2002 | Sakamoto | H01S 5/06804 315/291 |
| 2004/0109598 A1* | 6/2004 | Weiss et al. | 382/141 |
| 2005/0254045 A1* | 11/2005 | Weiss et al. | 356/237.5 |
| 2006/0018355 A1* | 1/2006 | Feitisch | H01S 5/4025 372/50.12 |
| 2006/0198402 A1* | 9/2006 | Hodgson | B23K 26/0622 372/22 |
| 2008/0019403 A1* | 1/2008 | Rogers | G02B 6/04 372/6 |
| 2008/0037604 A1* | 2/2008 | Savage-Leuchs | G02B 6/4296 372/44.01 |
| 2008/0132990 A1* | 6/2008 | Richardson | 623/1.12 |
| 2008/0264294 A1* | 10/2008 | Watson et al. | 106/31.01 |
| 2008/0304249 A1* | 12/2008 | Davey et al. | 362/20 |
| 2009/0012405 A1* | 1/2009 | Hasegawa | A61B 5/0084 600/478 |
| 2009/0046923 A1* | 2/2009 | Chang et al. | 382/152 |
| 2009/0084989 A1* | 4/2009 | Imai | 250/492.22 |
| 2009/0118578 A1* | 5/2009 | Takasugi | A61B 1/043 600/109 |
| 2009/0129420 A1* | 5/2009 | Regaard | H01S 5/4012 372/50.12 |
| 2009/0143645 A1* | 6/2009 | Matthes | 600/120 |
| 2009/0147076 A1* | 6/2009 | Ertas | 348/65 |
| 2009/0168186 A1* | 7/2009 | Williams et al. | 359/621 |
| 2009/0180176 A1* | 7/2009 | Armstrong et al. | 359/366 |
| 2009/0185583 A1* | 7/2009 | Kuksenkov et al. | 372/5 |
| 2009/0212707 A1* | 8/2009 | Stevn | 315/113 |
| 2009/0230394 A1* | 9/2009 | Nagaraja | H01L 27/14621 257/59 |
| 2009/0238226 A1* | 9/2009 | Moto | H01S 5/042 372/38.02 |
| 2010/0067355 A1* | 3/2010 | Eizumi | G11B 7/0903 369/112.23 |
| 2010/0189139 A1* | 7/2010 | Tamaoki | H01S 3/067 372/6 |
| 2010/0246926 A1* | 9/2010 | Patel | 382/133 |
| 2010/0316817 A1* | 12/2010 | Kimura et al. | 428/1.31 |
| 2011/0019513 A1* | 1/2011 | Ishimoto | B82Y 10/00 369/47.5 |
| 2011/0164649 A1* | 7/2011 | Xuan | H01S 3/1312 372/75 |
| 2011/0188105 A1* | 8/2011 | Wang | G02B 21/0032 359/210.1 |
| 2011/0228231 A1* | 9/2011 | Schreiber et al. | 353/31 |
| 2012/0002142 A1* | 1/2012 | Asaoka et al. | 349/86 |
| 2012/0070060 A1* | 3/2012 | Mahato | 382/133 |
| 2012/0113995 A1* | 5/2012 | Armstrong | 372/21 |
| 2012/0127748 A1* | 5/2012 | Kim | 362/555 |
| 2012/0253115 A1* | 10/2012 | Erin | 600/104 |
| 2012/0263198 A1* | 10/2012 | Oba | H01S 3/2308 372/6 |
| 2012/0281207 A1* | 11/2012 | Yoshimizu | G01N 21/9501 356/237.5 |
| 2012/0314286 A1* | 12/2012 | Chuang et al. | 359/489.08 |
| 2013/0022061 A1* | 1/2013 | Shimokoshi | H01S 3/09415 372/6 |
| 2013/0038838 A1* | 2/2013 | Ferri | H04N 9/3111 353/20 |
| 2014/0071520 A1* | 3/2014 | Armstrong | 359/334 |
| 2014/0240951 A1* | 8/2014 | Brady | F21V 13/08 362/19 |

* cited by examiner

APPARATUS FOR VIEWING THROUGH OPTICAL THIN FILM COLOR FILTERS AND THEIR OVERLAPS

BACKGROUND OF THE INVENTION

Field of the Invention

This invention relates in general to methods and systems for optical inspection of electronic devices, such as LCD and OLED displays, and, more particularly, to providing systems and methods for viewing through the optical thin film color filters and their overlaps.

Description of the Related Art

Liquid crystal display (LCD) panels incorporate liquid crystals that exhibit electric-field dependent light modulating properties. They are used most frequently to display images and other information in a variety of devices ranging from fax machines, cell phones, tablet and laptop computer screens, to large screen, high-definition TVs. Active matrix LCD panels are complex layered structures consisting of several functional layers: one or more layers of polarizing film; a TFT glass substrate incorporating thin-film transistors, storage capacitors, pixel electrodes and interconnect wiring, a color filter glass substrate incorporating a black matrix and a color filter array and a transparent common electrode; an orientation film made of polyimide; and the actual liquid crystal material incorporating plastic/glass spacers to maintain proper LCD cell thickness.

A novel color-filter-on-array (COA) technology permits color filters and TFT array to be fabricated on the same glass panel reducing the overall cost and improving viewing angle characteristics of the LCD device. Pursuant to this technology, the color filters are deposited directly on top of thin-film transistors formed on the TFT glass substrate. However, the deposited color filter material itself as well as various imperfections of the color filter deposition process, cause difficulty in viewing features buried underneath the aforesaid color filters and their overlaps during the inspection phase of the LCD manufacturing process.

Specifically, viewing through thin films to resolve features buried underneath presents a challenge due to interference effects which result in fringes and other artifacts appearing in captured image and making resolving of these features difficult or impossible. This task becomes further complicated due to the following circumstances. First, thin film is a color filter having optical transmission window which is just a fraction of illumination spectrum. Second, different color filters have transmission windows in different wavelength regions of optical spectrum and each single captured image contains spatial regions covered by different color filters. Third, there are spatial regions, boundaries, where different color filters spatially overlap being deposited on top of one another. Fourth, the thickness of the color filter film within the filter boundary may vary substantially. Finally, image acquisition must be done under control of machine vision algorithm and on the fly which requires high brightness source of illumination to generate enough light during exposure time or make a strobe pulse which is sufficiently short to prevent image blur.

Conventional solutions to the above problems involve using powerful broadband illumination light sources and filtering a small portion of the light from the object in the near infrared (IR) spectrum. At wavelengths in the infrared (IR) spectrum, the color filter materials have comparable optical transmissivity values, which results in substantial elimination of many of the aforesaid undesirable effects and greatly improves the visibility of underlying object structures.

However, the powerful broadband illumination sources used in conventional approaches generate substantial amounts of heat and do not produce sufficient light intensity to allow strobe imaging used for rapid image acquisition in modern high-throughput electronic device inspection systems.

SUMMARY OF THE INVENTION

The inventive concept is directed to methods and systems that substantially obviate one or more of the above and other problems associated with conventional techniques for viewing features buried underneath optical thin film color filters and their overlaps.

In accordance with one aspect of the present invention, there is provided an optical apparatus for creating an image of an object buried underneath one or more color filters. The apparatus incorporates an illumination light source producing an illuminating light, including at least three laser light emitters operating at different wavelengths. The illuminating light produced by the illumination light source is a combination of light signals produced by the at least three light emitters. The apparatus further includes an electronic control module coupled to each of the laser light emitters and configured to drive each of the laser light emitters using a pulsed driving signal; an illumination optical path delivering the illuminating light from the illumination light source to the object; and an image sensor for creating the image of the object using light collected from the object. In the apparatus, the at least three laser light emitters are operated in a saturation mode.

In one or more embodiments, the illumination optical path comprises at least three optical fibers coupled to the at least three laser light emitters and configured to transmit the light signals produced by the at least three light emitters.

In one or more embodiments, the at least three optical fibers are arranged in a spool.

In one or more embodiments, the illumination optical path further comprises an optical fiber coupler configured to combine the light signals transmitted by the at least three optical fibers into the illuminating light.

In one or more embodiments, the illumination optical path further includes a delivery optical fiber coupled to the optical fiber coupler and configured to transmit the illuminating light.

In one or more embodiments, the illumination light source comprises at least one heat sink coupled with respective at least three laser light emitters and configured to facilitate heat management of the at least three laser light emitters.

In one or more embodiments, the electronic control module is configured to control a duty cycle of the pulsed driving signal to facilitate heat management of the at least three laser light emitters.

In one or more embodiments, the electronic control module is configured to control at least one of amplitude and temporal parameters of the pulsed driving signal to facilitate a predetermined exposure of the image of the object created by the image sensor.

In one or more embodiments, the electronic control module is configured to supply individual electric pulsed driving signals to each of the at least three laser light emitters and wherein the individual pulsed driving signals having electric pulse shapes and amplitudes configured to induce a predetermined transient temperature change of a p-n junction of each of the at least three laser light emitters.

In one or more embodiments, the electronic control module is configured to individually control the pulse energy of light emitted by each of the at least three laser light emitters.

In one or more embodiments, the electronic control module is configured to individually control the wavelength and bandwidth of light emitted by each of the at least three laser light emitters.

In one or more embodiments, the at least three laser light emitters are operated at closely spaced wavelengths.

In one or more embodiments, a spectrum of the illuminating light source is located in a wavelength region where materials of color filters have substantially equal light transmittance.

In one or more embodiments, the image sensor has a sensitivity across a spectrum of the illuminating light produced by the illumination light source.

In one or more embodiments, an imaging optical path is provided for delivering the light from the object to the image sensor.

In accordance with another aspect of the present invention, there is provided a method for creating an image of features of an object buried underneath one or more color filters. The method involves: illuminating the object using illuminating light produced by an illumination light source, the illumination light source including at least three laser light emitters operating at different wavelengths, the illuminating light being a combination of light signals produced by the at least three light emitters, the illuminating light being delivered from the illumination light source to the object using an illumination optical path; driving, using an electronic control module coupled to each of the at least three laser light emitters, each of the at least three laser light emitters using a pulsed driving signal; and creating, using an image sensor, the image of the object using light collected from the object. In the aforesaid method, the at least three laser light emitters are operated in a saturation mode.

In one or more embodiments, the method further involves controlling a duty cycle of the pulsed driving signal to facilitate heat management of the at least three laser light emitters.

In one or more embodiments, the method further involves controlling at least one of amplitude and temporal parameters of the pulsed driving signal to facilitate a predetermined exposure of the image of the object created by the image sensor.

In one or more embodiments, the method further involves supplying individual electric pulsed driving signals to each of the at least three laser light emitters, the individual pulsed driving signals having electric pulse shapes and amplitudes configured to induce a predetermined transient temperature change of a p-n junction of each of the at least three laser light emitters.

In one or more embodiments, the method further involves individually controlling the pulse energy of light emitted by each of the at least three laser light emitters.

In one or more embodiments, the method further involves individually controlling the wavelength and bandwidth of light emitted by each of the at least three laser light emitters.

In one or more embodiments, the at least three laser light emitters are operated at closely spaced wavelengths.

In one or more embodiments, a spectrum of the illuminating light source is located in a wavelength region where materials of the one or more color filters have substantially equal light transmittance.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The above-described problems associated with viewing object features through optical thin film color filters and their overlaps are primarily caused by reflection or transmission effects at the interface of the color filters or between the interface and the surface of the filters or the array glass itself. Aspects of the present invention provide systems and methods for optical inspection of electronic devices, such as LCD and OLED displays, and, more particularly, to providing systems and methods for viewing through the optical thin film color filters and their overlaps.

Figure 1:
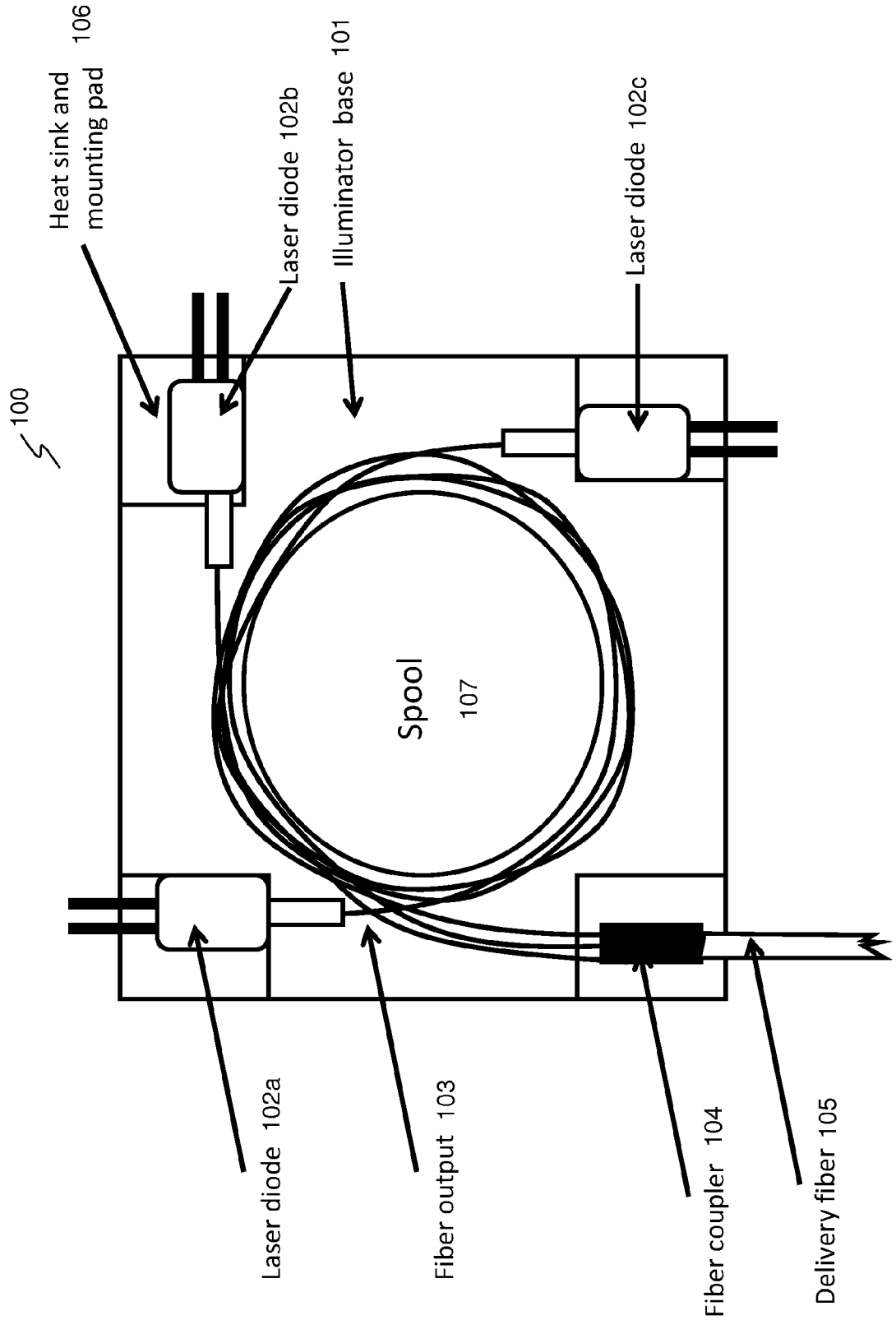
FIG. 1 illustrates one exemplary embodiment of such an illumination light source 100.

In accordance with one aspect of the described embodiment, there is provided an illumination light source for producing illumination for facilitating viewing through optical thin film color filters and their overlaps. FIG. 1 illustrates one exemplary embodiment of such an illumination light source 100. In order to overcome the aforesaid and other problems associated with viewing through optical thin film color filters and their overlaps, in accordance with one or more embodiments of the invention, the illumination light source 100 preferably incorporates multiple laser diodes (lasers) 102a, 102b and 102c with closely spaced wavelengths. The laser diodes 102a-102c are used for illumination of the object that is being inspected.

While the exemplary embodiment of the illumination light source 100 shown in FIG. 1 incorporates three laser diodes 102a, 102b and 102c, the present invention is not so limited. As would be appreciated by those of skill in the art, any other suitable number of laser diodes may be utilized. Also, the laser diodes 102a, 102b and 102c may be of any now known or later developed type or design. It should also be noted that the invention is not limited by the specific type of the light source used for illumination. In particular, other emitters of light may be used, including, without limitation, solid state lasers, light emitting diodes (LED), and fiber lasers.

In one or more embodiments, the laser diodes 102a-102c are mounted on the illumination base 101 by means of mounting pads 106, which also serve to dissipate the heat generated by laser diodes 102a-102c during their operation. The optical path of the light generated by the laser diodes 102a-102c (illumination optical path) includes fiber output 103, fiber spool 107, fiber coupler 104 and delivery fiber 105. The fiber coupler 104 combines the light outputs of multiple laser diodes 102a-102c into a single combined light beam.

Figure 2:
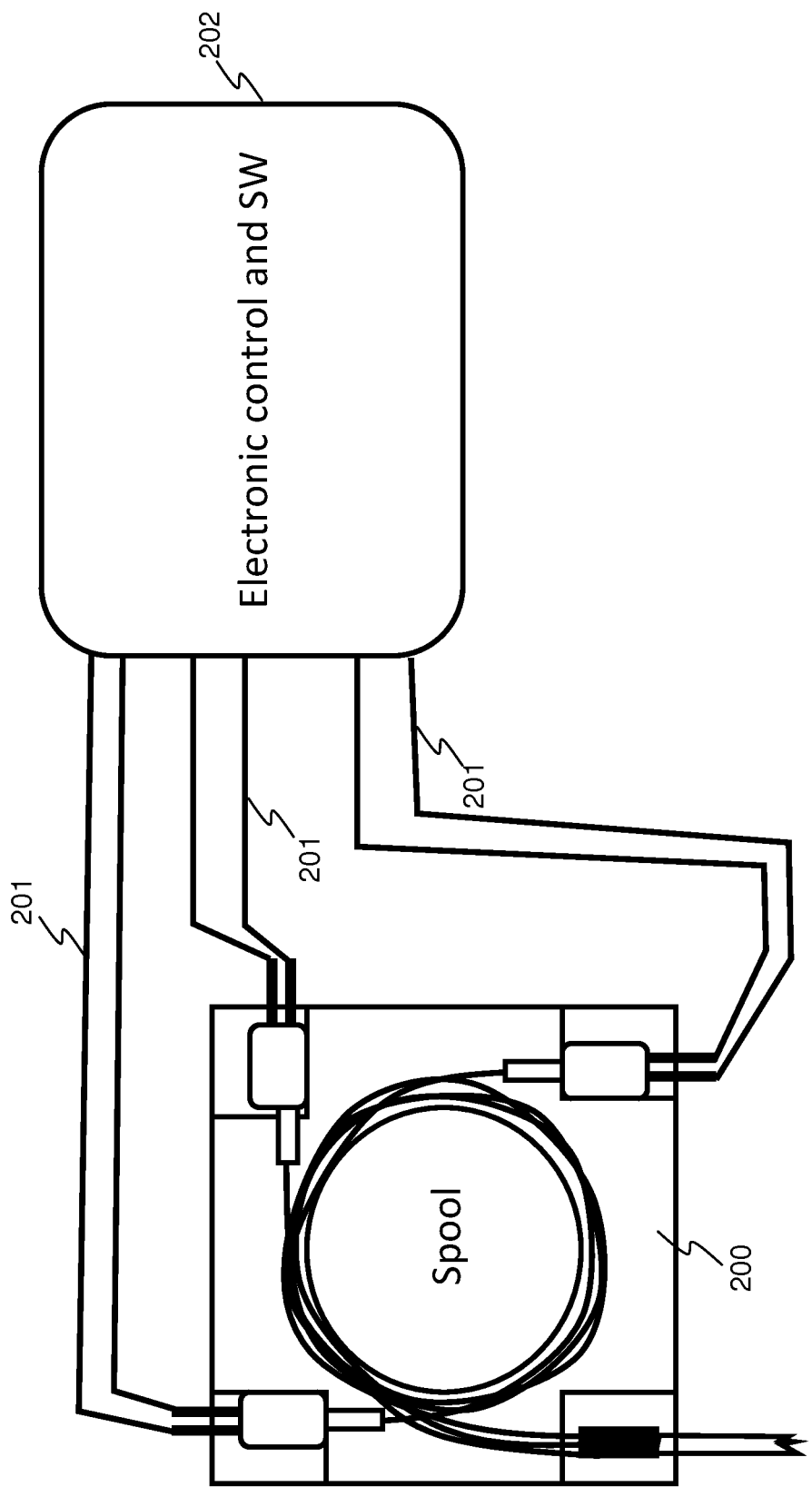
FIG. 2 illustrates an exemplary embodiment of an apparatus for producing illumination for facilitating viewing through optical thin film color filters and their overlaps.

FIG. 2 illustrates an exemplary embodiment of an apparatus for producing illumination for facilitating viewing through optical thin film color filters and their overlaps. The shown apparatus incorporates the illumination light source 100 described hereinabove, which includes multiple laser light diodes coupled via electrical interconnections 201 to electronic control and software module 202. The electronic control and software module 202 is configured to drive the laser diodes 102a-102c of the illumination light source 100 in accordance with a pulsed driving pattern. In one or more embodiments, the temporal parameters of the pulses, such as pulse duration and pulse shape, as well as pulse amplitude, are adjusted to achieve suitable brightness of the image. In one or more embodiments, such adjustment may be performed individually for each laser diode 102a-102c to achieve light pulse energy required for proper brightness. In particular, the pulsed "strobe-like" illumination of the object enables acquisition of high quality object images without blur and modulation when the image acquisition is being performed on the fly under conditions of moving camera.

In one or more embodiments, due to the presence of optical color filters obscuring the features of the object underneath, the spectrum of the illumination light source 100 is chosen to be located in wavelength region where all the color filter materials used in the manufacturing of the LCD panel have equal or almost equal transmittance. This ensures penetration of illumination light produced by the illumination light source 100 through any filter and any boundary of filters. In one or more embodiments, the wavelength of illumination light source 100 is selected to be as short as possible to preserve optical resolving power.

The illumination light produced by the illumination light source 100 is directed upon the object to be illuminated. The light reflected or scattered by the object is collected by the imaging optics (not shown) and the image sensor (not shown), which form the imaging optical path. In one or more embodiments, the electronic control and software module 202 performs overall control functions with respect to the image acquisition and also may perform the analysis of the image acquired by the image sensor.

In one or more embodiments, the image sensor used to produce an image of the inspected device has substantially not wavelength dependent response (sensitivity) across the entire illumination spectrum. In alternative embodiments, the aforesaid image sensor may have non flat response, which is compensated by controlling the amount of energy emitted by each diode through adjustment of the light pulse duration and shape. Specifically, in one exemplary implementation, the sensitivity of the image sensor varies within the used wavelength range (915 nm to 975 nm) by approximately 5 to 15%.

In one or more embodiments, the resulting spectral bandwidth of illumination light source is selected to be narrow enough in comparison to the bandwidth across which the optical properties of color filters change significantly, but broad enough in order to suppress interference fringes in terms of scalar intensity which may appear due to narrow spectral width of light emitted by an individual laser diode or other light source and slight variation of color filter properties over the illumination bandwidth. Thus, in one or more embodiments, the illumination light source is incoherent or has low spatial and temporal coherence.

As would be appreciated by those of skill in the art, an incoherent broadband high brightness sources may not be available for a particular wavelength region or subject to limitations on size, weight, brightness, and consumable power of the illumination light source, as it is for example, for near infrared (IR) region between 900 and 1050 nm. However, in accordance with an embodiment of the inventive concept, several discrete narrow bandwidths high brightness coherent sources falling within the region of interest may be utilized to produce the desired illumination light characteristics.

In one or more embodiments, increasing the number of light sources 102a-102c results in an improved cancellation of interference artifacts. In one or more embodiments, the choice of wavelength is done in such a way that one source creates a band of constructive interference, visible as a bright band, in place where another source creates a band of destructive interference, visible, as a dark band. If the image sensor acquiring the image of the object has equal response for both wavelengths or each wavelength has adjustable emitted energy or power, then effective cancellation of fringes takes place and the image sensor captures monochrome image without interference fringes. To make such a cancellation smooth, without shades, it is desirable to use higher number of narrow band sources and intensity of each wavelength should be made controllable individually. It should also be noted that broader bandwidth of each used light source results in a smoother cancellation of the interference fringes.

Because properties of color filters and their boundaries are not known or can vary slightly within the applicable wavelength range, in one or more embodiments, each narrow band illumination light source 102a-102c is made wavelength and bandwidth tunable. The multiple laser diodes 102a-102c used in the embodiment illustrated in FIG. 1 and having combined light outputs satisfy substantially all of the aforementioned requirements to the illumination light source 100.

As would be appreciated by those of skill in the art, the wavelength of the emitted light of a laser diode has a fairly strong dependence on the temperature of the p-n junction. Accordingly, in one or more embodiments, efficient control of the central wavelength for each laser diode 102a-102c is achieved by varying the aforesaid temperature of the corresponding p-n junction. To this end, the illumination light source 100 is used in conjunction with a pulsed electric pump with controlled electric pulse shape and amplitude, which operates to induce a transient temperature change of the p-n junction of the laser diodes 102a-102c. This results in a sweeping of the output spectrum of the laser diodes 102a-102c across the wavelength scale, which, in turn, causes the efficient light emission spectrum broadening and change of central wavelength.

In one or more embodiments, the duty cycle of the aforementioned pulsed driving pattern of the laser diodes 102a-102c is configured to be sufficiently low to allow diode temperature to come back to equilibrium state by the time of the next illumination pulse to ensure reproducibility of illumination parameters. In the same or an alternative embodiment, the temperature management of the laser diodes 102a-102c, which is accomplished using heat sink and mounting pad 106 which is configured to be sufficiently efficient in order to achieve the same purpose. The heat sink may be of any suitable configuration or design and may comprise, without limitation, stampings, extrusions, bonded and/or fabricated fins, castings and/or folded fins. In one embodiment a single heat sink is used for all light emitters. Optionally or alternatively, individual heat sinks are used for each and every of the aforesaid light emitters. In one exemplary implementation, the laser diodes 102a-102c in FIG. 1 are operating nominally at 915 nm, 940 nm and 975 nm. In alternative embodiments, lasers with other commercially available combinations of wavelength, such as 808 nm, 840 nm and 960 nm, or any other combinations selected out of nominal wavelengths set of 808 nm, 840 nm, 915 nm, 940 nm, 960 nm and 975 nm are utilized. However, as it would be appreciated by those of skill in the art, the present invention is not limited to utilizing the lasers of the listed nominal wavelength.

In one or more embodiments, the laser diodes 102a-102c are preferably operated in a saturation mode to reduce the illumination light coherence and eliminate the resulting speckle. As it is known to persons of skill in the art, saturation mode is characterized by amplitude of electric pump current exceeding certain threshold value after which further increase of electric current amplitude does not produce proportional increase of specific spectral density of emitted light power or energy but causes spectral broadening or the emitted light.

To this end, short driving pulses at high current are used. The short pulses also cause the laser diodes 102a-102c to operate in a frequency sweep mode that further broadens the spectrum of the delivered illumination light. In one or more embodiments, the pulses to each laser diode 102a-102c are controlled separately by the electronic control and software module 202 in order to balance light output and minimize interference effects. In addition, control of illumination for exposure purposes is achieved. The laser diodes 102a-102c are coupled using the fiber outputs 103 to a single delivery fiber 105 that is used to deliver illumination light to the object.

As would be appreciated by those of skill in the art, there exist a number of different approaches to reduce the coherence of the illumination light and avoid presence of speckles in the acquired images of the object. In one or more embodiments described hereinabove, operating the laser diode in a saturation mode, when energy output is quite high, causes decoupling of longitudinal modes of the emitted light, which is usually enough to avoid speckles in the resulting image.

In one or more embodiments, the coherence of the illumination light is further reduced in accordance with methodology and concepts described in U.S. patent application Ser. No.: 12/855,647 entitled: "High Speed Acquisition Vision System and Method for Selectively Viewing Object Features", which is incorporated herein by reference in its entirety.

Figure 3:
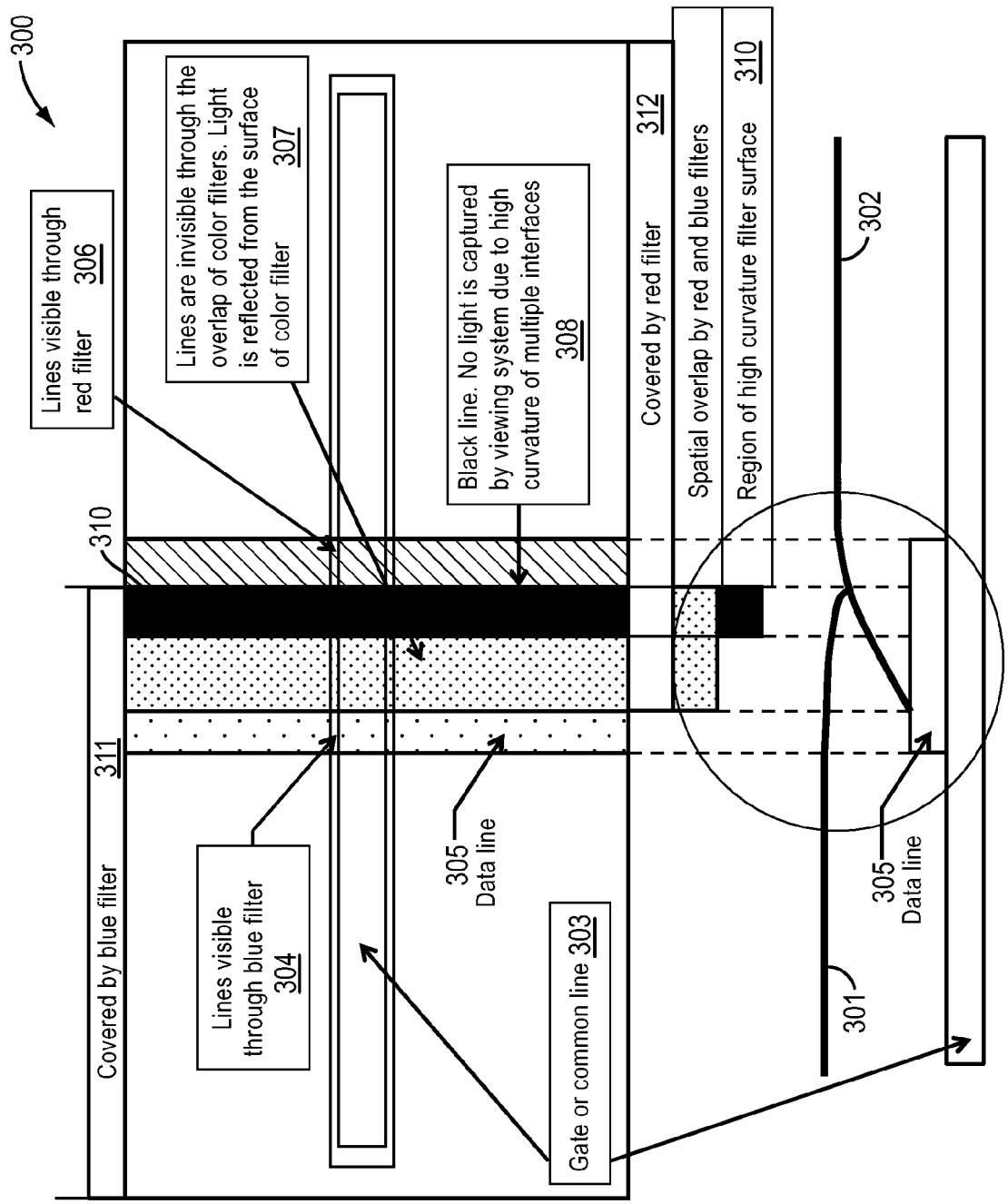
FIG. 3 illustrates an image of the LCD pixel having overlapping COA color filters obtained using the conventional imaging techniques.

FIG. 3 illustrates an image of the LCD pixel having overlapping COA color filters 301 and 302 obtained using the conventional imaging techniques. As indicated in the figure, pixel portion 311 is covered by the blue filter, while pixel portion 312 is covered by the red filter. Object features buried underneath the aforesaid filters include gate or common line 303 and data line 305. As could be seen from FIG. 3, while portions of the lines 304 and 306 are visible through the respective filters, no lines are visible through the overlap 307 of the aforesaid color filters. In addition, no light is captured by the black line area 308, which is characterized by a complete opacity due to the high curvature of multiple interfaces therein.

Figure 4:
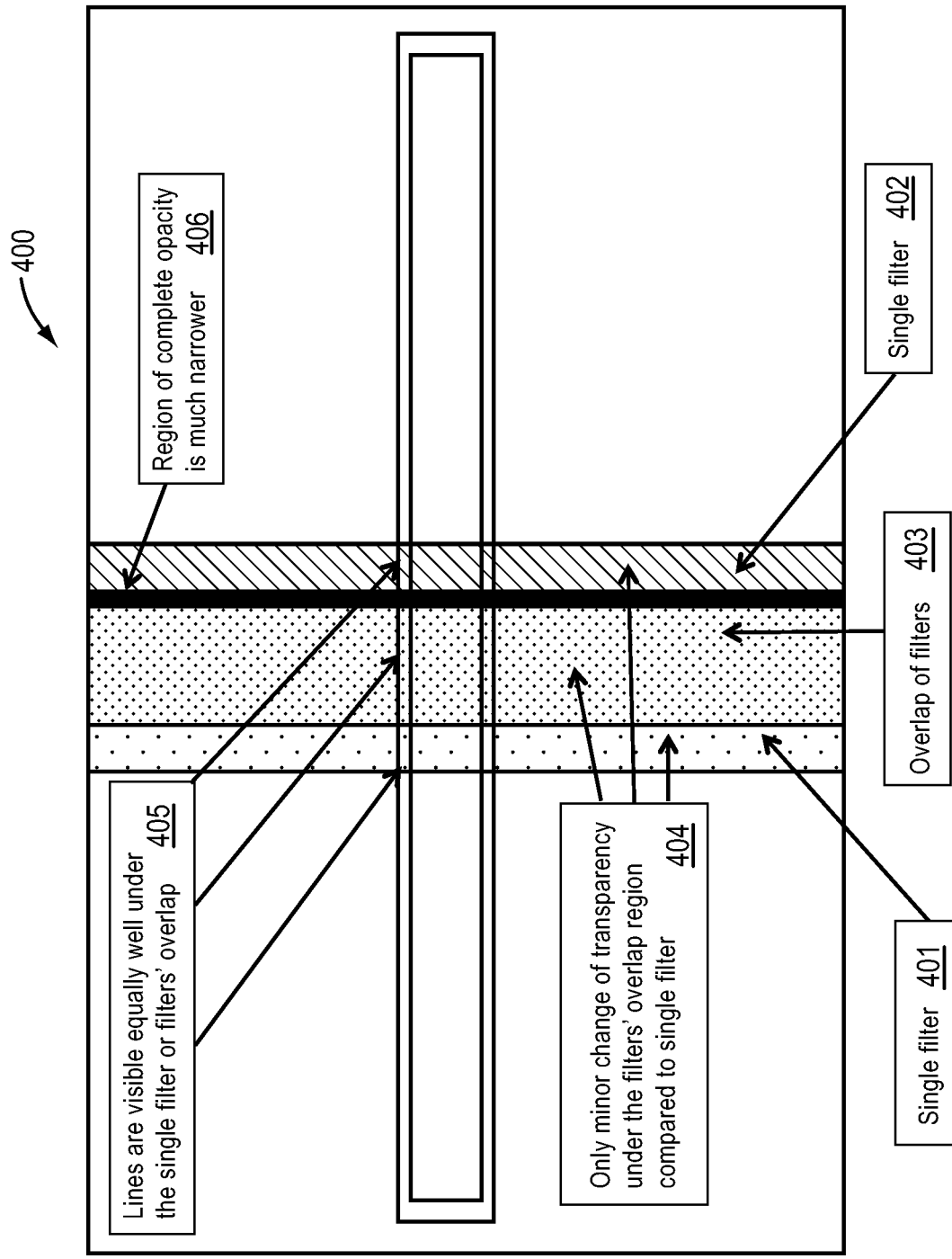
FIG. 4 illustrates an image of the LCD pixel having overlapping COA color filters obtained using an embodiment of the inventive illumination and imaging technique.

FIG. 4 illustrates an image of the LCD pixel having overlapping COA color filters obtained using an embodiment of the inventive illumination and imaging technique. As shown in the figure, common line and data line are not only visible under the single filter areas 401 and 402, but also underneath the overlap filter area 403, see FIG. 4, 405. The region of complete opacity 406 is much narrower compared with the corresponding area 308 of FIG. 3. Finally, the image of FIG. 4 is characterized by only a minor change of transparency under the filter overlap region compared to single filter regions, see FIG. 4, 404. Thus, various embodiments of the inventive illumination and imaging technique are characterized by substantial improvements in acquired image quality.

It should be noted that the design of various optical components of the described system, including the laser diodes 102a-102c, the optical fibers 103 and 105, the fiber coupler 104, the imaging optics and the image sensor can be of any present or future developed type or design and such components are well known to persons of ordinary skill in the art and widely available commercially.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Moreover, other implementations of the invention will be apparent to those skilled in the art from consideration of the specification and practice of the invention disclosed herein. Various aspects and/or components of the described embodiments may be used singly or in any combination in the system for viewing through optical thin film color filters and their overlaps. It is intended that the specification and examples be considered as exemplary only, with a true scope and spirit of the invention being indicated by the following claims.

What is claimed is:

1. An optical apparatus for creating an image of an object buried underneath one or more color filters, the apparatus comprising: a. an illumination light source producing an illuminating light, the illumination light source comprising at least three laser light emitters, each of the at least three laser light emitters operating at a different wavelength from the other light laser emitters, the illuminating light being a combination of light signals produced by the at least three light emitters; b. an electronic control module coupled to each of the at least three laser light emitters and configured to drive each of the at least three laser light emitters using a pulsed driving signal applied to the each of the at least three laser light emitters; c. an illumination optical path delivering the illuminating light from the illumination light source to the object buried underneath one or more color filters; and d. an image sensor for creating the image of the object buried underneath one or more color filters using light collected from the object, wherein the pulsed driving signal applied to the each of the at least three laser light emitters exceeds a predetermined threshold corresponding to spectral broadening of the illuminating light.

2. The optical apparatus of claim 1, wherein the illumination optical path comprises at least three optical fibers coupled to the at least three laser light emitters and configured to transmit the light signals produced by the at least three light emitters.

3. The optical apparatus of claim 2, wherein the at least three optical fibers are arranged in a spool.

4. The optical apparatus of claim 2, wherein the illumination optical path further comprises an optical fiber coupler configured to combine the light signals transmitted by the at least three optical fibers into the illuminating light.

5. The optical apparatus of claim 4, wherein the illumination optical path further comprises a delivery optical fiber coupled to the optical fiber coupler and configured to transmit the illuminating light.

6. The optical apparatus of claim 1, wherein the illumination light source comprises at least one heat sink coupled with respective at least three laser light emitters and configured to facilitate heat management of the at least three laser light emitters.

7. The optical apparatus of claim 1, wherein the electronic control module is configured to control a duty cycle of the pulsed driving signal to facilitate heat management of the at least three laser light emitters.

8. The optical apparatus of claim 1, wherein the electronic control module is configured to control at least one of amplitude and temporal parameters of the pulsed driving signal to facilitate a predetermined exposure of the image of the object created by the image sensor.

9. The optical apparatus of claim 1, wherein the electronic control module is configured to supply individual electric pulsed driving signals to each of the at least three laser light emitters and wherein the individual pulsed driving signals having electric pulse shapes and amplitudes configured to induce a predetermined transient temperature change of a p-n junction of each of the at least three laser light emitters.

10. The optical apparatus of claim 1, wherein the electronic control module is configured to individually control the pulse energy of light emitted by each of the at least three laser light emitters.

11. The optical apparatus of claim 1, wherein the electronic control module is configured to individually control the wavelength and bandwidth of light emitted by each of the at least three laser light emitters.

12. The optical apparatus of claim 1, wherein the at least three laser light emitters are operated at closely spaced wavelengths.

13. The optical apparatus of claim 1, wherein a spectrum of the illuminating light source is located in a wavelength region where materials of the one or more color filters have substantially equal light transmittance.

14. The optical apparatus of claim 1, wherein the image sensor has a sensitivity across a spectrum of the illuminating light produced by the illumination light source.

15. The optical apparatus of claim 1, further comprising an imaging optical path for delivering the light from the object to the image sensor.

16. A method for creating an image of features of an object buried underneath one or more color filters, the method comprising: a. illuminating the object using illuminating light produced by an illumination light source, the illumination light source comprising at least three laser light emitters, each of the at least three laser light emitters operating at a different wavelength from the other light laser emitters, the illuminating light being a combination of light signals produced by the at least three light emitters, wherein the illuminating light is delivered from the illumination light source to the object using an illumination optical path; b. driving, using an electronic control module coupled to each of the at least three laser light emitters, each of the at least three laser light emitters using a pulsed driving signal applied to the each of the at least three laser light emitters; and c. creating, using an image sensor, the image of the object buried underneath one or more color filters using light collected from the object buried underneath one or more color filters, wherein the light from the object buried underneath one or more color filters is delivered to the image sensor and wherein the pulsed driving signal applied to the each of the at least three laser light emitters exceeds a predetermined threshold corresponding to spectral broadening of the illuminating light.

17. The method of claim 16, further comprising controlling a duty cycle of the pulsed driving signal to facilitate heat management of the at least three laser light emitters.

18. The method of claim 16, further comprising controlling at least one of amplitude and temporal parameters of the pulsed driving signal to facilitate a predetermined exposure of the image of the object created by the image sensor.

19. The method of claim 16, further comprising supplying individual electric pulsed driving signals to each of the at least three laser light emitters, the individual pulsed driving signals having electric pulse shapes and amplitudes configured to induce a predetermined transient temperature change of a p-n junction of each of the at least three laser light emitters.

20. The method of claim 16, further comprising individually controlling the pulse energy of light emitted by each of the at least three laser light emitters.

21. The method of claim 16, further comprising individually controlling the wavelength and bandwidth of light emitted by each of the at least three laser light emitters.

22. The method of claim 16, wherein the at least three laser light emitters are operated at closely spaced wavelengths.

23. The method of claim 16, wherein a spectrum of the illuminating light source is located in a wavelength region where materials of the one or more color filters have substantially equal light transmittance.

* * * * *